April 26, 1966   R. W. SUTTON ETAL   3,248,009
BEER DISPENSER AND METHOD OF DISPENSING
Filed June 19, 1964   4 Sheets-Sheet 1

LESLIE R. PEAKE
MAL A. ROLFSON
GEORGE W. SHOOP
ROBERT W. SUTTON
INVENTORS.

BY
BUCKHORN, BLORE, KLARQUIST & SPARKMAN
ATTORNEYS

April 26, 1966  R. W. SUTTON ETAL  3,248,009
BEER DISPENSER AND METHOD OF DISPENSING
Filed June 19, 1964  4 Sheets-Sheet 2

LESLIE R. PEAKE
MAL A. ROLFSON
GEORGE W. SHOOP
ROBERT W. SUTTON
INVENTORS.

BY
BUCKHORN, BLORE, KLARQUIST & SPARKMAN
ATTORNEYS

April 26, 1966 R. W. SUTTON ETAL 3,248,009
BEER DISPENSER AND METHOD OF DISPENSING
Filed June 19, 1964 4 Sheets-Sheet 4

LESLIE R. PEAKE
MAL A. ROLFSON
GEORGE W. SHOOP
ROBERT W. SUTTON
INVENTORS.

BY
BUCKHORN, BLORE, KLARQUIST & SPARKMAN
ATTORNEYS

United States Patent Office 3,248,009
Patented Apr. 26, 1966

3,248,009
BEER DISPENSER AND METHOD OF
DISPENSING
Robert W. Sutton, Wilsonville, Leslie R. Peake and Mal
A. Rolfson, Milwaukie, and George W. Shoop, Portland, Oreg., assignors to Leslie Peake Enterprises, Inc.,
Milwaukie, Oreg., a corporation of Oregon
Filed June 19, 1964, Ser. No. 376,343
27 Claims. (Cl. 222—1)

The present invention relates to apparatus for automatically dispensing a measured quantity of liquid and more particularly to a draft beer dispenser.

Draft beer must be stored in a cool place under pressure to preserve its desired taste and to prevent spoilage due to bacterial action. Draft beer is also difficult to dispense because of its tendency to foam when agitated and warmed.

Because of the above problems, prior art beer dispensers, and particularly those for dispensing a measured quantity of beer, have not been altogether successful. Some such dispensers agitate the beer during its flow from the keg to the tap, resulting in an undesirably large head and consequent spillage, while others fail to maintain the beer at the same temperature and pressure as the beer in the keg, so that the beer dispensed differs in taste from the beer in the keg. In still other dispensers the beer must flow through various valve mechanisms and chambers which not only agitate the beer, but are also difficult to keep clean and therefore are subject to bacterial action which affects the taste of the beer and the size of the head on each serving of beer.

Accordingly a primary object of the invention is to provide an apparatus that dispenses beer in substantially the same condition, including taste and temperature, as it comes from the keg.

Another primary object of the present invention is to provide a new and improved apparatus for dispensing consistently an exact predetermined quantity of beer having a predetermined size of head.

Another object of the invention is to provide a new and improved beer dispenser that is easy to keep clean and sanitary to use.

Still another object of the invention is to provide a new and improved beer dispenser that maintains all of the beer retained therein after each pour unexposed to the atmosphere and at the same temperature and pressure as the beer in the attached keg so as to minimize bacterial action and prevent spoilage even after long intervals between pours.

A more specific object is to provide a beer dispenser which controls the flow of beer from the keg to the tap by a novel valve arrangement that does not agitate or contaminate the beer.

Another specific object of the invention is to provide a dispenser that is adjustable for varying the quantity of liquid dispensed in successive pours.

A further object is to provide a dispenser that will selectively dispense, without adjustment, two or more different volumes of liquid from the same discharge orifice.

Carelessness in dispensing, pilferage, and the dispensing of occasional free drinks to friends by tavern employees, are problems in most taverns that can result in large economic losses to the tavern owner.

To obviate these problems, another primary object of the invention is to provide a beer dispenser that records every drink dispensed, and every different size of drink dispensed independently so that the total quantity dispensed within any given time interval can be accurately computed and so that employees can be held to account for any shortages in receipts.

In connection with the same problems, another object is to provide a dispenser having a tamper-proof interior and having working parts, including counters and valve mechanism, accessible only through a locked cover.

A further object is to provide a dispenser having a safety shut-off valve operable in the event of power failure or failure of the mechanism controlling the closing of the primary shut-off valve.

Another object is to provide a dispenser having a novel edge-lighted advertising panel.

Another object is to provide a dispenser in which the electrical wiring, motors, counters and other elements that could be damaged by exposure to liquid are isolated from the fluid line and so arranged that in the event the line should rupture, the released liquid will not come into contact with such elements.

In furtherance of the above objects and in accordance with an illustrated embodiment, our beer dispenser includes a housing structure divided by an interior wall into a front compartment and a back compartment, with a continuous supply line passing upwardly through the back compartment from a keg, and downwardly through the front compartment to a discharge orifice. The downwardly directed portion of the line near the discharge orifice is made of a compressible rubber-like material which is squeezed together by a pair of cooperative pinching members to shut off the flow through the line. Each pinching member is actuated alternately into and out of pinching engagement with the line by a separate cam driven by its own constant speed electric motor. One cam is a different size than the other so that each cam until the pinching member actuated by such cam are actuated one at a time. Each cam also has an adjustable circumference for varying the quantity of liquid that can be dispensed thereby. When one of the motors is energized, it remains energized to rotate its associated cam until the pinching member actuated by such cam completes one full cycle of operation in which the compressible line section is opened and then again pinched closed, after which an automatic shut-off device de-energizes the motor.

The above and other objects and advantages of the present will become more apparent from the following description and the accompanying drawings wherein:

FIG. 11 is a diagrammatic view showing a shut-off valve arrangement incorporating a safety shut-off feature;

HOUSING

Figure 1:
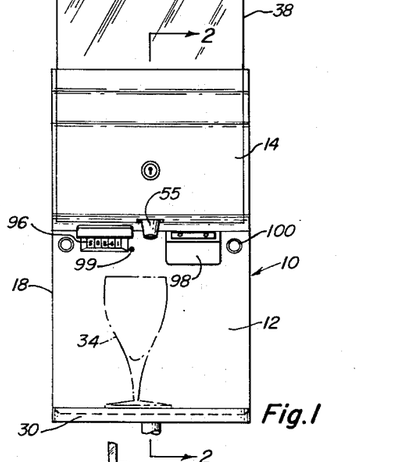
FIG. 1 is a front elevational view of a dispenser in accordance with the present invention.
Figure 2:
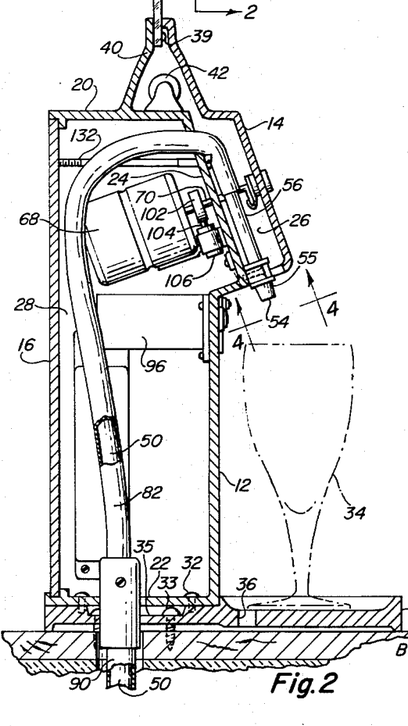
FIG. 2 is a vertical sectional view through the housing of the dispenser taken approximately along the line 2—2 of FIG. 1.
Figure 2:
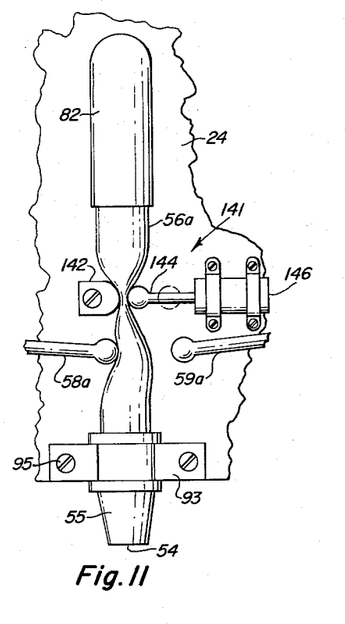

With reference to the drawings, FIGS. 1 and 2 illustrate a dispenser including an upright, generally rectangular housing structure 10 having a front wall 12 including a removable and lockable front cover 14 in the upper portion of the front wall and a removable back wall, or cover, 16. The front and back walls are joined by opposite sidewalls 18 and top and bottom walls 20 and 22, all of which are integral with the lower portion of the front wall 12. The housing also includes an interior wall 24, integral with the top wall 12, sidewalls 18, and lower front wall 12, which divides the interior of the housing into a relatively small front compartment 26 accessible through the front cover and a much larger rear compartment 28 accessible through the back cover.

A removable tray, or sink, 30 projects horizontally and forwardly from the lower edge of the front wall and is fastened by machine screws 32 to the bottom wall 22. The tray, in turn, is secured to the top of the counter 86 by fasteners 33 the heads of which are contained within a recess 35 of the tray beneath the bottom wall 22, thereby preventing removal of the dispenser or the tray from the counter without first gaining access into the back compartment of the dispenser. A beer glass 34, when placed on the depressed upper surface of the tray 30, will be positioned beneath the nozzle of the dispenser for receiving beer, even though the glass should be on one side of the tray as shown in FIG. 1. The tray also includes a drain opening 36 which may be internally threaded for receiving a drain hose (not shown) for disposing of any liquid accidentally spilled into the tray. Alternatively, the dispenser could be wall mounted by fastening the back cover 16 to the wall and then securing the remainder of the housing to the back cover in a manner to be described.

As will be noted from FIG. 2, the lower front wall, top and bottom walls, opposite sidewalls and interior wall 24 are integral with one another and designed so that such elements can be die cast as a unit.

A feature of the housing is the provision of an advertising display panel 38 made of transparent or translucent material and fastened by screws 39 at its bottom edge to an upwardly projecting portion 40 of the top wall. The upper portion of the front cover 14 extends over the bottom edge portion of the panel and together with the projecting top wall portion 40 defines a space within the front compartment for receiving a fluorescent light 42. When the light is illuminated, light therefrom is transmitted upwardly through the bottom edge of the display panel 38 so as to illuminate the entire panel and give a back-lighted effect to any advertising material displayed on the front surface of the panel.

VALVE MECHANISM

Figure 3:
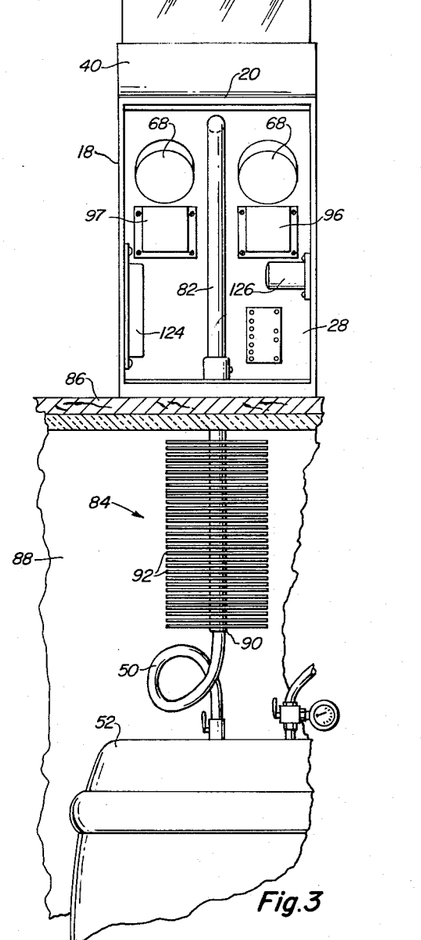
FIG. 3 is a view showing the back of the dispenser of FIG. 1 with the back cover removed and also showing a section through a cooling compartment beneath the dispenser, including a device for cooling liquid within the dispenser.
Figure 4:
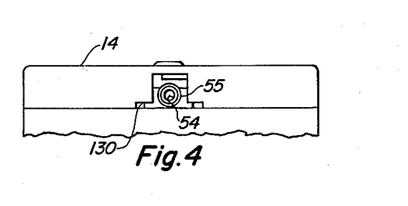
FIG. 4 is a bottom view of the front cover of the dispenser taken along the line 4—4 of FIG. 2.

Referring especially to FIGS. 2 and 3, a continuous flexible supply line, or conduit, 50 extends upwardly from a source of liquid under pressure, such as the keg 52 of beer shown in FIG. 3, through the bottom wall of the housing, into the back compartment 28, and then through the interior wall 24 and down through the front compartment 26 to a discharge orifice 54 at the lower end of a nozzle 55 positioned in an opening in the bottom of the front cover 14. An important sanitary feature of this arrangement is that the beer never leaves the conduit 50 as it flows smoothly from the keg to the discharge orifice, and, as will become apparent below, the beer does not flow through any moving valve parts or other mechanisms other than the conduit itself so that the beer cannot become contaminated from such foreign sources during its flow from the keg to the glass. This feature also makes the dispenser easy to clean, simply by disconnecting the line at the keg and flushing it with an appropriate cleaning solution. The rest of the dispenser does not require cleaning since the beer never contacts parts other than the line 50.

Figure 5:
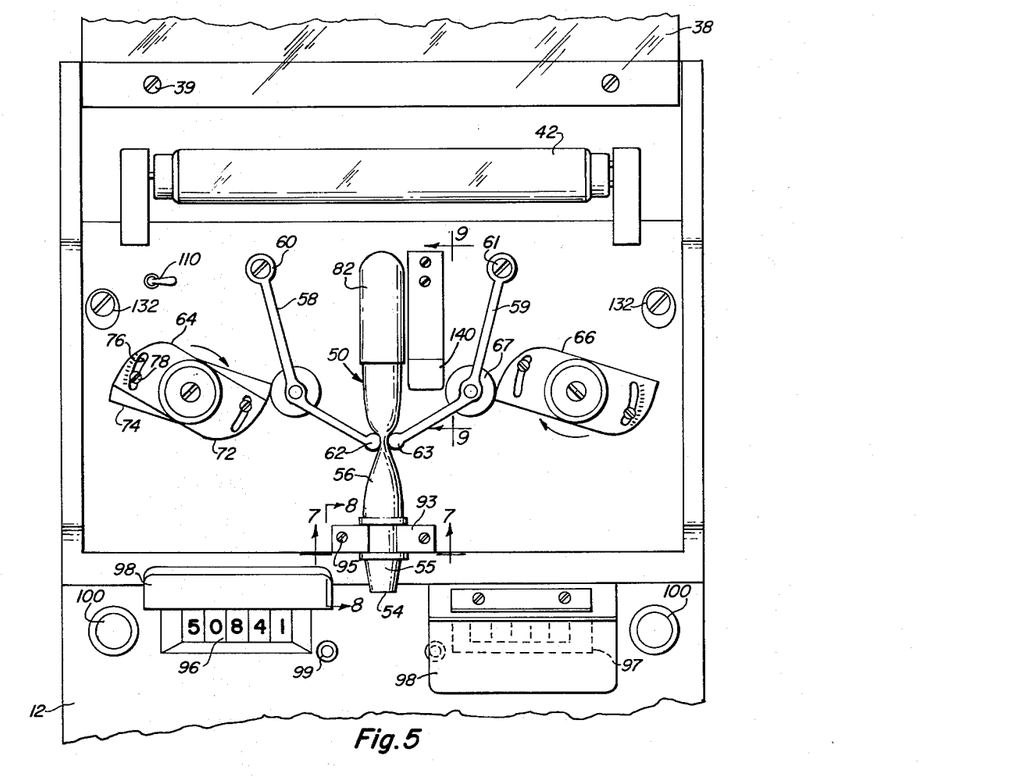
FIG. 5 is an enlarged fragmentary view of the front of the dispenser with the front cover removed to show details of the shut-off valve mechanism.

The downwardly directed portion of the line in the front compartment includes a compressible elastic, rubber-like section 56 adjacent the nozzle 55. This section can be made of a suitable soft plastic or rubber material, such as surgical tubing, which can be pinched closed to stop the flow of liquid therethrough, but which will spring back to its original tubular shape when relaxed to permit the unrestricted flow of liquid. It is clear, however, that a limp, compressible material, such as liquid-proofed cloth, having no elasticity and little tendency to retain its shape could likewise be used for the compressible conduit section 56, in which case the internal pressure of the liquid itself would cause the conduit to assume a tubular shape in the absence of external constrictive forces acting on the section. As best shown in FIG. 5, the flow of beer through the dispenser is normally shut off by a pinch valve arrangement of which the compressible line section 56 forms an important part. The pinch valve also includes a constricting means for pinching the compressible line section closed and an actuating means for moving the constricting means into and out of pinching engagement with the compressible line section.

The illustrated constricting means includes a pair of angular levers 58, 59 fastened at their respective upper ends 60, 61 to the front face of the interior wall 24 on opposite sides of the compressible line section 56 for movement toward and away from such section. Each lever 58, 59 is actually fastened securely to the panel 24 so that its lower, pinching end 62, 63 respectively is, when unrestrained, out of pinching engagement with the line as shown by the lever 59 in FIG. 6. However, the levers are composed of a springy but rigid plastic material which enables the lower, pinching end of each lever to be deflected into pinching engagement with the line 56 even though the upper end of such lever is fixedly anchored to the panel.

The levers are actuated toward and away from the line 56 by a pair of rotatable cams 64, 66 each of which engages a rotatable cam follower wheel 67 at the midsection of its respective lever. Each of the cams in turn is rotated by an independent drive means comprising a separate constant speed electric motor 68 for each cam. The motors are mounted in the back compartment of the housing and have drive shafts 70 extending forwardly through the interior wall 24 to their respective cams.

Figure 6:
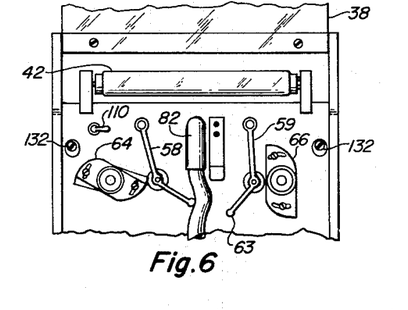
FIG. 6 is a fragmentary view similar to that of FIG. 5 showing the shut-off valve in an open position.

Each cam is double-ended and designed so that when rotated through one-half a revolution, or 180°, it oscillates its associated lever through one complete cycle to open and close again the line section 56. When the dispenser is not operating, both cams urge their respective levers into pinching engagement with the line to prevent the flow of beer therethrough. In dispensing beer or other liquid only one cam and lever is actuated at a time as shown in FIG. 6. Thus, assuming that the speed of rotation of the cams, pressure of the liquid and diameter of the line all remain constant, the size and shape of the cam actuated determines the length of time the line remains open and therefore the quantity of liquid dispensed during each one-half revolution of such cam. As will be evident from FIG. 5, both of the cams 64, 66 are adjustable so that the size of pour effected thereby can be varied with each different cam setting. It will also be evident from FIG. 5 that the left-hand cam 64 is adjusted so as to dispense a lesser quantity of liquid than the right-hand cam 66, since the projecting ends of the former have greater peripheral lengths than those of the latter, whereby the left-hand lever 58 remains pressed against the line for a greater proportionate part of each one-half revolution of its cam than does the right-hand lever. Thus one of the cams could be set for dispensing, for example, a 12-ounce serving whereas the other could be set so as to dispense an 8-ounce serving, both through the same line 50 and orifice 54.

In the embodiment of FIG. 5 each of the cams 64, 66 is made adjustable by being divided edgewise into two separate sections, or laminations, 72, 74 of similar size and shape, one, 74, of which is fixed to the drive shaft 70 and the other, 72, of which is loosely mounted on such shaft and therefore rotatable relative to the fixed cam section. The rotatable section 72 has a pair of calibrated slots 76 at opposite ends thereof through which a pair of set screws 78 extend from the fixed cam section for clamping the rotatable section in its adjusted position to the fixed section. Each calibration, of course, represents a different cam setting for obtaining a predetermined quantity of liquid.

An important feature is that each cam 64, 66 is shaped so that when rotated in a clockwise direction as indicated by the directional arrows in FIG. 5, the pinch valve will open suddenly but close gradually so that a minimum amount of foam will be generated with each serving. A sudden opening of the valve provides a uniform, nonturbulent initial flow of beer from the dispenser whereas a gradual closing of the valve prevents the agitation of beer remaining in the line and keg after each pour.

An important advantage of the foregoing arrangement is that the pinch valve is at the downwardly directed portion of the line 50 so that all beer remaining in the dispenser following each pour is behind the pinch valve and therefore maintained under approximately the same pressure as the beer in the keg. This feature prevents the beer in the line from going flat and retards bacterial action. The pinch valve is also positioned close to the discharge orifice so that any bacterial action occurring in that portion of the line which is between the discharge orifice 54 and the pinch valve and which is therefore exposed to the atmosphere between pours, will not affect the taste or head characteristics of beer flowing therethrough when the pinch valve is opened.

COOLING

The beer in the line 50 within the dispenser is also maintained at a predetermined desired temperature approximating the temperature of the beer in the keg. We have found this temperature to be approximately 37° F. in order to obtain a beer temperature of approximately 40° F. in the glass. Of course, these figures will vary depending on the preference of the customer and the amount of head desired with each serving. For the above keg and glass temperatures, we have found that the carbon dioxide or air pressure at the keg should be between 9 and 11 pounds per square inch, or in other words at a pressure sufficient to cause a clear, nonturbulent flow of beer through the line 50. In order to maintain the temperature of the beer in the dispenser at the same temperature as the beer in the keg, the line 50 is encased in a high heat conductive material such as the copper case 82 which extends continuously from the inlet opening in the bottom wall of the housing to a position adjacent the pinch valve. The casing is coupled at its lower end to a heat exchanger 84 beneath the counter top 86 on which the dispenser is secured and within the cooling compartment 88 in which the keg is stored. The heat exchanger in this instance comprises a finned structure having a central tubular portion 90 through which the lower portion of the line 50 within the cooling compartment extends and a plurality of cooling fins 92 extending laterally on opposite sides of the tubular portion to provide a plurality of cooling surfaces. Thus heat within the dispenser and line 50 is conducted through the metal casing 82 to the heat exchanger so as to effect a cooling of beer in that portion of the line 50 within the dispenser.

CLEANING

Figure 7:
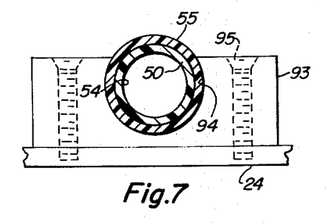
FIG. 7 is an enlarged view taken along the line 7—7 of FIG. 5 showing a clamp for positioning the nozzle end of the conduit of the dispenser.
Figure 8:
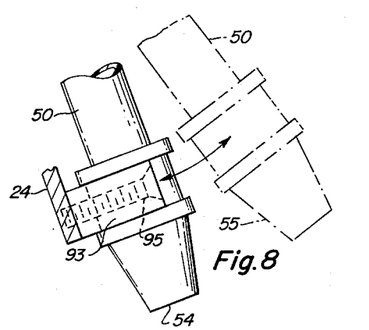
FIG. 8 is a side view of the clamp of FIG. 7 taken approximately along the line 8—8 of FIG. 5 and illustrating the snap-out feature of the clamp.

The discharge end of the line 50 terminates within the nozzle 55, which is made of a hard, but slightly deformable plastic material. The nozzle is gripped within a clamping member 93 shown most clearly in FIGS. 5, 7 and 8, and positioned so that beer or other liquid dispensed therefrom will strike a side of the glass 34 placed on the tray 30 so as to reduce splatter and prevent an overly large head. As shown best in FIG. 7, the clamp 93 has a central C-shaped depression 94 in its outer surface into which the nozzle is pressed. The depression is dimensioned so that the nozzle can be snapped into and out of the depression by a slight hand pressure in the manner illustrated in FIG. 8. The clamp is secured by screws 95 to the lower edge of the interior wall panel 24. With this arrangement, the discharge end of the line 50 between the discharge orifice 54 and the pinch valve may be cleaned even while beer is in the remaining portion of the line 50 behind the pinch valve, simply by snapping the nozzle out of the clamp and inserting a long-handled cylindrical scrub brush soaked in a suitable cleaning solution into the line through the discharge orifice.

METERING

A pair of electrically operated counters 96, 97 are mounted in the rear compartment beneath the motors, with the numbered faces of the counters visible through openings in the lower front wall section of the housing. As shown in the wiring diagram of FIG. 10, there is a separate counter and counter circuit for each one of the motors. A lid 98 hinged at its upper edge to the front wall 12 covers each counter when in a lowered position. A starter button 99 next to the face of each counter beneath the lid is depressed by pressing a glass against the lid so as to energize the motor and thus actuate the valve actuating mechanism on the same side of the housing as the button. Each time one of the cams is rotated through activation of its associated motor, the appropriate counter is actuated once to record the serving dispensed. Thus each counter records an accurate running total of the number of servings dispensed by the cam and lever directly thereabove. Since each cam and lever has its own independently operated counter, and because the quantity dispensed through actuation of each cam is predetermined, the total quantity of beer dispensed and quantity remaining in the keg can be easily computed.

A red indicator light 100 adjacent each counter and visible through the front face of the housing is normally illuminated when current flows to the dispenser but not through the motor. When one of the starter buttons 99 is depressed a sufficient length of time to activate its associated motor, the appurtenant indicator light goes out, indicating to the operator that the starter button may be released. The indicator light goes on again automatically upon de-energization of the motor at the completion of one cycle of the cam and lever.

CONTROLS

Figure 10:
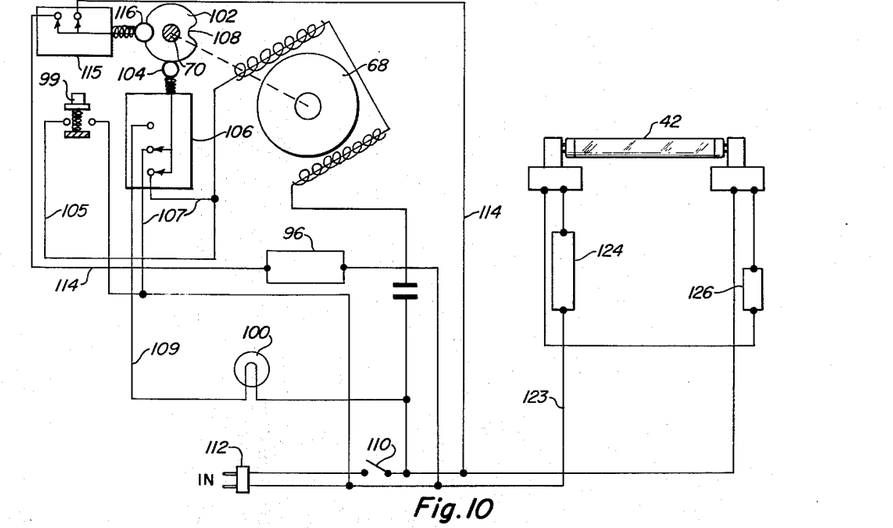
FIG. 10 is a wiring diagram illustrating one manner of wiring the dispenser.

Referring to the wiring diagram of FIG. 10 and to FIG. 2, means are provided for keeping each motor 68 energized after its starter button has been momentarily depressed and released until the lever has been oscillated through one cycle, whereupon the motor is automatically de-energized. This means includes a switch cam 102 affixed to the drive shaft 70 for each motor 68 behind the interior wall 24. The periphery of each switch cam engages a depressible roller button 104 of a microswitch 106 mounted alongside the motor in the rear compartment. Each switch cam also has a pair of rounded notches 108 spaced 180° apart in its periphery. When the roller button 104 lies within one of the notches 108, current cannot flow through the microswitch 106 to the motor but can flow through the indicator light 100. When the button is depressed through rotation of the switch cam, current flows through the microswitch to the motor, but not to the indicator light.

OPERATION

In operation, one of the two starter buttons 99 is depressed to complete a circuit 105 through the motor 68, bypassing the microswitch 106. At this point the pinch valve is closed and the roller button of the microswitch lies within one of the notches 108. However, by depressing the starter button the motor is energized to rotate its drive shaft 70 and switch cam 102 so as to depress the roller button 104, thereby completing a circuit 107 through the microswitch to the motor and at the same time breaking the circuit 109 through the indicator light. When this happens, the starter button may be released, and the motor will continue to operate so long as the roller button of the microswitch remains depressed by the raised portion of the switch cam. After the motor shaft 70 has rotated 180°, the spring-biased roller button 104 springs upwardly into the other notch 108 of the switch cam to again break the circuit 107 through the microswitch to the motor, and complete the circuit 109 through the indicator light. When this occurs, the associated valve cam will also have been rotated through 180° so as to oscillate the abutting lever through one cycle to open and pinch closed again the line section 56. Thus, by depressing one of the starter buttons 99, the associated valve-actuating mechanism is automatically cycled through one complete dispensing operation and then deactivated.

A master shut-off switch 110 in one of the main lead lines to the plug 112 and operable from the front face of the interior wall 24 controls the flow of current to all of the electrically operated elements of the dispenser. It will be understood that the diagram of FIG. 10 illustrates only one of the two motor circuits, and that another, identical motor circuit is connected to the leads from the plug 112, to control the operation of the other motor 68 and its associated indicator light and counter.

A counter circuit 114 including the counter 96, is associated with each motor circuit and includes a second microswitch 115 having a depressible roller button 116 in engagement with the switch cam 102. The roller button 116 is positioned so that it is normally depressed by the switch cam 102 when the motor 68 is de-energized. However, when the motor is energized to rotate the switch cam 102 and the associated valve cam through each 180° operating cycle, the roller button 116, being spring-biased outwardly, is momentarily released into one of the notches 108 in the switch cam to complete the counter circuit and send an electrical impulse through the counter, thereby actuating the same. This arrangement actuates the counter only after an operating cycle of the motor has been irrevocably commenced, thus insuring that a serving is counted only when actually dispensed and not when the starter button is depressed an insufficient length of time to start the cycle.

The fluorescent lamp circuit 123 is also illustrated in the diagram of FIG. 10, such circuit including the usual components for such a lamp including a ballast 124 and a starter 126 in addition to the lamp 42 itself.

LOCKING AND OTHER FEATURES

Another feature of the dispenser is that the mechanical pinch valve actuating elements are located in the front compartment of the housing whereas the wiring, motors, counters and other electrical components that might be damaged by liquid are located in the back compartment. The interior wall 24 and metal casing 82 provide an effective barrier so that in the event any portion of the fluid line 50 should rupture, the liquid will flow either down through the metal casing 82 in the back compartment and out of the housing through the central opening in the bottom wall, or else into the front compartment and out through drain orifices 130 provided in the bottom of the front cover 14 adjacent the discharge nozzle 55, without ever contacting the electrical components.

Another important feature of the dispenser is that it is tamper proof, with the interior of the dispenser being accessible only by authorized personnel having a key which unlocks the front cover 14. In this connection it will be noted from FIG. 2 that the back wall 16 of the dispenser is fastened in place by a pair of long shanked screws 132, the heads of which are in abutment with the front face of the interior wall 24 so that the fasteners and thus the back can be removed only by first unlocking and removing the front cover. It will also be noted that the screws 32 which fasten the tray 30 to the bottom wall of the housing are accessible for removal only from the inside of the back compartment. Thus before the tray can be removed, the back cover unit would first be removed, which, as already pointed out, requires removal of the lockable front cover 14.

Figure 9:
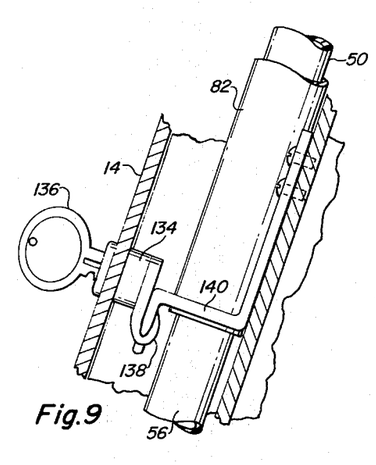
FIG. 9 is an enlarged sectional view taken along the line 9—9 of FIG. 5 showing the locking mechanism of the dispenser.

The locking mechanism for the front cover is shown in FIGS. 5 and 9 and includes a rotatable locking cylinder 134 on the inside front cover which is rotated by a key 136 inserted into an appropriate slot in the front face of the cylinder. The cylinder 134 includes a hooked portion 138 which is shaped and positioned for engaging the back side of a catch 140 secured to the front face of the interior wall 24 laterally adjacent the fluid line 50.

SAFETY SHUTOFF

A further desirable feature, illustrated in the modification of FIG. 11, is a safety shut-off valve shown generally at 141 which stops the flow of liquid through the line 50 in the event of a loss of voltage to the motors. If the electrical system should fail with the compressible line section open and without any safety shut-off valve, the keg, of course, would be quickly emptied. The illustrated safety shut-off is an auxiliary pinch valve positioned above the levers 58a and 59a of the cam-actuated main pinch valve. The auxiliary pinch valve includes a stationary post 142 positioned in engagement with the compressible line section 56a, and a solenoid-actuated pinching rod 144 disposed on an opposite side of the compressible line section from the stationary post. The pinching rod 144 is reciprocated by a solenoid 146 which is wired so that when no current flows through the main leads to the plug 112, the pinching rod is spring-biased into pinching engagement with the compressible line section. However, when current flows through the main leads into the dispenser, the pinching rod is retracted to its dotted-line position by the solenoid so that flow of fluid through the line is controlled solely by the cam-actuated constricting rods 58a and 59a.

MODIFICATIONS

Figure 12:
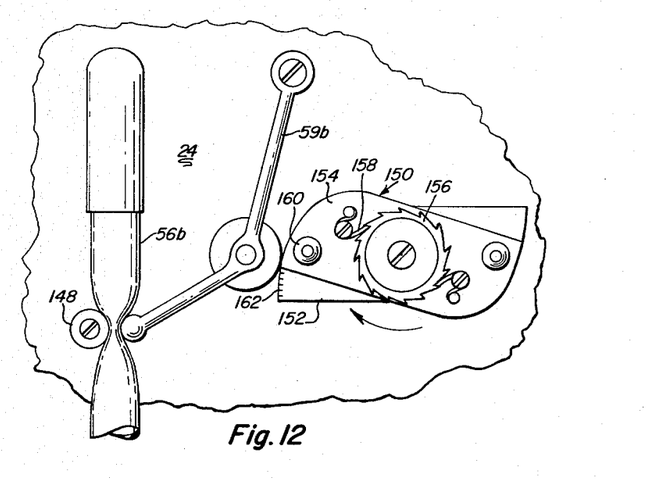
FIG. 12 is a schematic view illustrating a modified shut-off valve construction in accordance with the present invention.

FIG. 12 illustrates a further modification in which a single adjustable cam 150 and a single movable lever 59b in cooperation with a stationary pinching post 148 constricts the compressible line section 56b. This arrangement will, of course, provide for dispensing only one quantity of liquid for each cam setting rather than two different quantities as with the dual cam and lever arrangement shown in FIG. 5.

The adjustable cam 150 possesses a modified adjustment means that differs from that of the cams 64 and 66 of FIG. 5. The cam 150 is split edgewise into two sections 152 and 154, with the section 152 being fixedly mounted on the central drive shaft (not shown) and the section 154 being loosely mounted on such shaft so as to be rotatable relative to the fixed cam section. A ratchet toothed gear 156 is also fixed to the drive shaft and is engaged by a pair of spring-biased dogs 158 on the rotatable cam section 154. The ratchet teeth and dogs coact so as to permit rotation of the section 154 relative to the section 152 in a clockwise direction as viewed in FIG. 12, but so as to resist rotation in a counter-clockwise direction. Thus when the appurtenant drive shaft is rotated in a clockwise direction both cam sections rotate together as a unit with the shaft. Knobs 160 are provided on the cam section 154 to assist in rotation of such section. Calibrations 162 may also be provided at the edge of the fixed cam section to indicate the quantity of liquid dispensed for each cam setting.

It will be apparent from the foregoing description that our dispenser has many advantages not found in other dispensers. Having illustrated and described several embodiments of our invention, it should be apparent to those skilled in the art that the invention permits of modification in arrangement and detail. For example, many alternative mechanical arrangements for pinching closed the compressible line section could be devised including the use of gearing, or fluid-actuated power cylinders. Similarly, other means could be provided for varying the operating cycle of the constricting means such as, for example, variable speed gearing or variable speed motors. We claim as our invention all modifications as come within the true spirit and scope of the appended claims.

We claim:

1. A dispenser for draft beer and other liquids that lose their desired characteristics upon prolonged atmospheric exposure, said dispenser comprising:
   a conduit connected at one end to a source of supply under pressure and having at the opposite end a discharge orifice,
   said conduit having a compressible section passing downwardly in the direction of flow, to said discharge orifice,
   constricting means movable into pinching engagement with said compressible section at a single position along said section for pinching closed said section to the flow of liquid therethrough,
   rotatable actuating means for moving said constricting means successively into and out of pinching engagement with said compressible section,
   drive means for driving said actuating means, including means for manually energizing said drive means and automatically de-energizing said drive means after each successive opening and closing of said compressible section,
   said actuating means including adjustable measuring means for regulating the length of time said constricting means remains out of pinching engagement with said section during each opening and closing of said constricting means so as to regulate the quantity of liquid dispensed during each operating cycle.

2. Apparatus for dispensing a measured quantity of liquid comprising:
   a conduit for conveying liquid including a discharge orifice,
   said conduit comprising a compressible section permitting, when relaxed, the unrestricted passage of liquid therethrough,
   constricting means movable toward and away from said compressible section for pinching closed said section to shut off the flow of liquid therethrough,
   actuating means operatively connected to said constricting means for moving said constricting means successively into and out of pinching engagement with said compressible section alternately to open and close said section to the flow of the liquid therethrough,
   said actuating means normally maintaining said constricting means in pinching engagement with said compressible section to prevent the flow of liquid through said section,
   drive means for driving said actuating means,
   measuring means in association with said actuating means for regulating the period of time said constricting means remains out of pinching engagement with said compressible section during each operating cycle of said pinching means so as to permit a predetermined quantity of liquid to flow from said discharge orifice during each said cycle,
   manually operable starter means for selectively activating said drive means,
   and means for maintaining said drive means in an activated condition following the actuation and release of said starter means, including shut-off means for automatically deactivating said drive means upon the completion of an operating cycle of said constricting means.

3. Apparatus for dispensing a measured quantity of liquid comprising:
   a conduit for conveying liquid under pressure, including an inlet end for connection to a source of supply and a discharge orifice at the opposite end,
   said conduit including a compressible conduit section,
   constricting means movable into and out of pinching engagement with said compressible section for pinching closed said section to prevent the flow of liquid to said discharge orifice,
   rotatable cam means engaging said constricting means for moving said constricting means alternately toward and away from said compressible section so as successively to open and pinch closed said section, and for controlling the period of time that said constricting means is out of pinching engagement with said section during each opening and closing thereof,
   said cam means, when in an inactive position, maintaining said constricting means in pinching engagement with said compressible section,
   drive means for driving said cam means, including means for manually energizing said drive means,
   and shut-off means for automatically de-energizing said drive means upon the movement of said constricting means through one complete operating cycle.

4. Apparatus for dispensing a measured quantity of liquid comprising:
   a conduit for conveying liquid, including an inlet end for connection to a source of supply and a discharge end,
   said conduit including a compressible section,
   constricting means including a lever pivotally mounted for movement into and out of pinching engagement with said compressible section for pinching closed said section,
   rotatable cam means for moving said lever alternately into and out of pinching engagement with said compressible section,
   said cam means, when inactive, normally maintaining said lever in pinching engagement with said compressible section to close the same,
   drive means for rotating said cam, including starter means for selectively energizing said drive means,
   means for maintaining said drive means energized following the actuation of said starter means,
   and shut-off means for de-energizing said drive means upon completion of each successive opening and closing of said compressible section.

5. Apparatus for dispensing a measured quantity of liquid comprising:
   a conduit for conveying liquid under pressure, including an inlet end for connection to a source of supply and a discharge end,
   said conduit including a compressible conduit section,
   a pair of constricting means disposed on opposite sides of said compressible section, each positioned for movement into and out of pinching engagement with said section for pinching closed said section between said means,
   a pair of independently operable actuating means each for moving a different one of said constricting means alternately into and out of pinching engagement with said compressible section so that when either one of said constricting means is out of engagement with said section, said section is open to liquid flow therethrough, drive means for driving each of said actuating means independently of the other said actuating means, separate measuring means in association with each said actuating means for controlling the length of time said compressible section remains open to fluid flow during each operating cycle of their respective associated constricting means, each of said measuring means being constructed for maintaining its respective said constricting means out of pinching engagement with said compressible section a different length of time than the other said constricting means during each cycle of said constricting means so as to measure a different quantity of fluid flow than the other of said measuring means.

6. Apparatus according to claim 5 wherein each said measuring means is adjustable for varying the quantity of liquid dispensed during an operating cycle of its associated constricting means.

7. Apparatus according to claim 5 wherein said constricting means comprise a pair of levers, and said actuating means and said measuring means comprise a pair of cams, one engaging each of said levers.

8. Apparatus according to claim 3 wherein said cam means is adjustable for varying the quantity of liquid dispensed during each operating cycle of said constricting means.

9. In apparatus for dispensing a measured quantity of liquid including a conduit for conveying liquid under pressure from a supply source to a discharge orifice and a pinch valve for regulating the flow from said orifice, an adjustable cam engaging said pinch valve means for opening and closing said pinch valve means and for varying the quantity of flow past said valve during each opening and closing thereof, said cam being divided edgewise into two layers of similar size and shape, said layers being rotatable relative to one another about the axis of rotation of said cam so as to vary the peripheral distance around said cam from a minimum when said layers are in register through a progressively increasing value to a maximum when the corresponding portions of said layers are rotationally separated to the maximum possible extent such that the length of time said pinch valve remains open during each opening and closing thereof varies directly with said distance, and means for releasably securing said layers in their relative adjusted positions.

10. Apparatus for dispensing a measured quantity of liquid comprising:

a conduit for conveying liquid including an inlet end for connection to a source of supply and a discharge orifice at the opposite end, said conduit including a compressible conduit section, lever means movable to a closed position for pinching closed said compressible section, rotatable cam means for actuating said lever means alternately into and out of said closed position for controlling the measure of flow of liquid from said discharge orifice, constant speed drive means for rotating said cam means, and means in association with said drive means for selectively energizing said drive means, maintaining said drive means energized through one complete operating cycle of said lever means to open and close again said compressible section, and then de-energizing said drive means upon completion of said cycle.

11. Apparatus according to claim 2 wherein said actuating means includes means for effecting the opening of said compressible section to full flow suddenly and for effecting the closure of said compressible section gradually, thereby preventing the agitation of liquid within the conduit and source of supply and the turbulent flow of liquid from said discharge orifice.

12. In a dispenser for draft beer and other beverages having gaseous components, including a conduit for conveying said beverage from a source of supply under pressure to a discharge orifice and a pinch valve for regulating the flow of beverage from said orifice, a cam for opening and closing said pinch valve means and for regulating the quantity of flow from said orifice during each successive opening and closing thereof, said cam being shaped so as to open said valve suddenly to provide an initial full and nonturbulent flow through said conduit past said valve, and so as to close said valve gradually to prevent agitation of the beverage within said source and said conduit and to prevent the release of gaseous components from said beverage.

13. A dispenser for draft and other liquids comprising: an enclosed housing structure, a conduit within said housing for conveying liquid under pressure from a source external to said housing to a discharge orifice, said conduit including a discharge portion extending downwardly in the direction of flow to said discharge orifice, valve means in association with said discharge portion for controlling the flow of liquid through said portion and from said discharge orifice, casing means having a high coefficient of heat conduction encasing said conduit continuously from adjacent said external source to the high-pressure side of said valve means, and cooling means for cooling said external source, said controlling means being in communication with said casing means for cooling by conduction liquid within said housing until discharged through said valve means.

14. Apparatus for dispensing draft beer and other liquids comprising:

a housing, a conduit within said housing for conveying liquid under pressure from a source external to said housing to a discharge orifice, said conduit including an inflow portion extending upwardly in the direction of flow through the interior of said housing from said external source, and a discharge portion extending downwardly within said housing to said discharge orifice, said discharge portion comprising a compressible conduit section, constricting means within said housing for selectively pinching closed said compressible section to prevent the flow of liquid through said conduit, casing means comprising a high heat conductive material encasing the inflow portion of said conduit to a position closely adjacent said constricting means, cooling means external to said housing for cooling said external source, said cooling means being connected to the inflow end of said conduit for cooling by conduction liquid within said conduit until discharge past said constricting means.

15. Apparatus according to claim 14 wherein said cooling means comprises a member composed of high heat conductive material encasing a continuation of said conduit external to said housing and coupled to an end portion of said casing means, said member including a plurality of fin-like projections providing a plurality of heat-exchanging surfaces.

16. Apparatus for dispensing a measured quantity of liquid comprising:

a conduit for conveying liquid under pressure from a supply source to a discharge orifice, said conduit including a compressible conduit section, constricting means movable into engagement with said compressible section for pinching closed said section to prevent the flow of liquid to said discharge orifice, actuating means for moving said constricting means alternately into and out of engagement with said compressible section to open and close said section to the flow of liquid, drive means for driving said actuating means, an auxiliary constricting means laterally adjacent said compressible section including means for actuating said auxiliary constricting means to pinch closed said section operable in response to a loss of power in said drive means so as to prevent the uncontrolled flow of liquid from said discharge orifice.

17. A dispenser or draft beer and other liquids comprising:

a housing, a conduit within said housing for conveying liquid from a source external to said housing to a discharge orifice, said conduit including a discharge portion extending downwardly in the direction of flow to said discharge orifice, said discharge portion comprising a compressible conduit section, pinch valve means within said housing for selectively pinching closed and releasing said compressible section so as to control the flow of liquid to said orifice, clamping means releasably clamping said discharge portion immediately adjacent said discharge orifice in a predetermined position for directing a stream of liquid from said orifice in a constant, predetermined downward path, said clamping means including a rigid collar surrounding the discharge end of said compressible conduit section and rigid but resiliently separable clamping arms on said housing engaging and partially surrounding said collar such that said collar and the conduit section inside can be released from clamping engagement with said arms through application of a slight lateral force on said collar in a direction toward the space separating said arms, said discharge portion extending in a substantially straight path from said discharge orifice to said pinch valve means so that said portion can be easily cleaned internally from said discharge orifice upon release of said portion from said clamping means.

18. Apparatus for dispensing a measured quantity of liquid comprising:

an upright housing structure having an integral interior wall dividing the interior of said housing into a front portion and a back portion, a flexible conduit for conveying liquid through said interior extending upwardly in the direction of flow through said back portion, through said interior wall and downwardly through said front portion to a discharge orifice, the downwardly directed portion of said conduit including a compressible conduit section, constricting means in said front portion for alternately pinching closed and releasing said compressible section so as to control the flow of liquid from said discharge orifice, actuating means within said front portion for actuating said pinching means into and out of pinching engagement with said compressible section, motor means within said back portion, including a drive shaft passing through said interior wall for driving said actuating means, switching means in said back portion and accessible from the exterior of said housing for energizing said drive means, liquid-proof means in said back portion encasing the upwardly extending portion of said conduit and extending through said interior wall into said front portion, said housing having drain openings in communication with said front portion for draining liquid from said front portion in the event of rupture of said conduit.

19. Apparatus for dispensing a measured quantity of liquid comprising:

an upright housing structure including an interior wall dividing the interior of said housing into a front portion and a back portion, a flexible conduit for conveying liquid passing in the direction of flow from a source of supply into said back portion, through said interior wall, into said front portion and then to a discharge orifice at the front of said housing, said conduit including a compressible conduit section, constricting means in said front portion movable into pinching engagement with said compressible section for pinching closed said section to the flow of liquid therethrough, actuating means in said front portion for actuating said constricting means into and out of pinching engagement with said compressible section for alternately opening and pinching closed said compressible section, drive means for driving said actuating means, including an electric motor in said back portion and a drive shaft extending through said interior wall into said front portion for driving said actuating means, counter means in said back portion for recording each successive opening and closing of said compressible section, said counter means being visible but not accessible from the exterior of said housing, starter switch means within said back portion and actuatable from the exterior of said housing for energizing said drive means, automatic shut-off means within said back portion for de-energizing said drive means after each successive opening and closing of said compressible section, a removable front cover providing access to said front portion, said front cover including means for locking said cover over said front portion, a removable back cover providing access to said back portion, including means for removing said back cover, said means for removing said back portion being accessible only from within said front portion so that said back portion can be entered only after said front cover has been unlocked and removed.

20. Apparatus according to claim 19 including a tray portion projecting laterally from the lower end of said housing beneath said discharge orifice, fastening means for fastening said tray to the bottom end of said housing, said fastening means being accessible for removing said tray from said housing only from the interior of said back portion so that said tray cannot be removed without first unlocking and removing said front cover.

21. Apparatus for dispensing a measured quantity of liquid comprising:

an upright housing structure, an interior partition dividing the interior of said housing into a relatively small front portion and a larger back portion, a conduit passing through the interior of said housing for conveying liquid from a source of supply, said conduit including a compressible conduit section passing downwardly in the direction of flow to a discharge orifice positioned at an opening in a front wall of said housing, pinch valve means within said housing for opening and closing said compressible section to liquid flow by pinching and releasing the same, actuating means within said housing for opening and closing said pinch valve means, including drive means for driving said actuating means, starter means in said housing actuatable from the exterior of said housing for energizing said drive means,
means for maintaining said drive means energized following actuation and release of said starter means and for de-energizing said drive means after each successive opening and closing of said pinch valve means,
light indicator means operatively connected to said drive means and visible from the exterior of said housing through said front wall,
said light indicator means being connected to said drive means so as to indicate the energized and de-energized condition of said drive means.

22. Apparatus for dispensing a measured quantity of liquid comprising:
an upstanding housing structure including a front wall, a back wall, and an interior wall dividing the interior of said housing into a front portion and a back portion,
a liquid-carrying conduit extending upwardly in the direction of flow through said back portion from a source of supply and downwardly through said front portion to a discharge orifice at an opening in said front wall,
at least a portion of said conduit in said front portion including a compressible conduit section,
a pair of constricting means in said front portion on opposite sides of said compressible section movable into cooperative pinching engagement with said compressible section for pinching closed said compressible section to the flow of liquid therethrough,
a pair of actuating means in said front portion each for actuating a different one of said constricting means alternately into and out of pinching engagement with said compressible section,
independent drive means in said back portion for driving each of said actuating means independently of the other thereof,
measuring means in association with each said actuating means for regulating the length of time each corresponding constricting means remains out of pinching engagement with said compressible section during each operating cycle of said constricting means,
one of said constricting means being regulated so as to remain out of pinching engagement for a greater length of time than the other of said constricting means during their respective operating cycles for permitting a greater volume of flow than the other,
a pair of starter switches actuatable from the exterior of said housing each for energizing a different one of said drive means at different times,
shut-off means for de-energizing each said drive means upon completion of each operating cycle by its associated constricting means,
and a pair of counter means operable independently of one another, each for recording the number of operating cycles of a different one of said constricting means so that an accurate record of the quantity of liquid dispensed from the apparatus can be maintained.

23. Apparatus for dispensing draft beer comprising:
an upright housing structure,
a conduit within said housing for conveying liquid from a source of supply under pressure to a discharge orifice at the front of said housing,
said conduit including a compressible section passing downwardly in the direction of flow to said discharge orifice,
pinch valve means within said housing for opening and pinching closed said compressible section to the flow of beer therethrough,
actuating means in said housing opening and closing said pinch valve means, said actuating means being actuatable from the exterior of said housing,
an advertising display means projecting outwardly from a wall of said housing, said means being composed of a light-transmitting material,
one end portion of said display means projecting into the interior of said housing through an opening in a wall of said housing,
a light source within said housing and positioned adjacent said one end of said display means so that light rays from said source pass into said one end and through said material to illuminate said display means.

24. Apparatus for dispensing a measured quantity of liquid comprising:
a conduit in a pressurized system for conveying liquid from a source of supply to a discharge orifice,
said conduit comprising a compressible section permitting, when relaxed, the unrestricted passage of liquid therethrough,
constricting means movable toward and away from said compressible section for pinching closed said section to the flow of liquid therethrough,
actuating means operatively connected to said constricting means for moving said constricting means successively into and out of pinching engagement with said compressible section so as alternately to open and close said section to the flow of liquid therethrough,
said actuating means normally maintaining said constricting means in pinching engagement with said compressible section to prevent the flow of liquid through said section,
drive means for driving said actuating means,
measuring means in association with said actuating means for regulating the period of time said constricting means remains out of pinching engagement with said compressible section during each operating cycle of said constricting means so as to permit a predetermined quantity of liquid to flow from said discharge orifice during each said cycle,
and shut-off means in association with said drive means for automatically deactivating said drive means when said constricting means has completed an operating cycle and returned to a position closing said compressible section.

25. The method of dispensing under pressure beverages having gaseous components comprising the steps:
placing a supply of said beverage under pressure,
opening a flow passage connected to said supply while concurrently shaping said flow passage to form in the region of the closure of the passage conical entrance and exit portions with their apexes meeting in the region of the closure for initial and continued streamlined flow of said beverage,
opening said passage at a rate high enough to prevent the turbulent flow of said beverage past said closure, and
terminating the flow of said beverage at a controlled rate slow enough to prevent any substantial release from said beverage of said gaseous components.

26. A dispenser for draft beer and other beverages having gaseous components comprising:
means for storing a supply of said beverage under a pressure greater than atmospheric pressure,
passage means extending from said supply to a discharge orifice,
said passage means including a resilient, normally open but compressible closure section permitting when relaxed a streamlined flow of said beverage therethrough,
closure means movable toward and away from said compressible section for alternately opening and pinching closed said section to the flow of beverage therethrough,
and closure-actuating means connected to said closure means,
said actuating means including means for moving said closure means out of closing engagement with said closure section at a rate fast enough to cause an initial and continued nonturbulent streamlined flow of beverage through said section, said actuating means including additional means for moving said closure means into full pinching engagement with said closure section at a controlled rate slow enough so as to prevent any substantial release of said gaseous components from said beverage on the pressure side of said closure means, said rate of closing being substantially slower than said rate of opening of said closure means.

27. A dispenser according to claim 26 wherein said closure means includes a pair of pinching members, each having a blunt rounded pinching surface for engaging said closure section such that streamlined flow of said beverage past said closure means occurs during the opening and closing engagement of said members with said section.

References Cited by the Examiner

UNITED STATES PATENTS

| | | | |
|---|---|---|---|
| 1,427,455 | 8/1922 | Gates | 251—7 X |
| 2,356,212 | 8/1944 | Burdett et al. | 251—7 X |
| 2,628,009 | 2/1953 | Idzi. | |
| 2,681,751 | 6/1954 | Stone et al. | 222—70 X |
| 2,782,012 | 2/1957 | Coyne et al. | 222—70 X |
| 2,810,991 | 10/1957 | Mead et al. | 251—7 X |
| 2,895,653 | 7/1959 | Giepen | 251—9 X |
| 3,031,102 | 4/1962 | Storms | 222—70 X |
| 3,049,142 | 8/1962 | Oliver | 251—7 X |

LOUIS J. DEMBO, *Primary Examiner.*

CHARLES R. CARTER, *Examiner.*